US009393887B1

(12) United States Patent
Beis

(10) Patent No.: US 9,393,887 B1
(45) Date of Patent: Jul. 19, 2016

(54) PORTABLE SEAT ASSEMBLY

(71) Applicant: Konstantinos Beis, Long Island City, NY (US)

(72) Inventor: Konstantinos Beis, Long Island City, NY (US)

( * ) Notice: Subject to any disclaimer, the term of this patent is extended or adjusted under 35 U.S.C. 154(b) by 0 days.

(21) Appl. No.: 14/670,462

(22) Filed: Mar. 27, 2015

(51) Int. Cl.
B60N 2/00 (2006.01)
B60N 2/30 (2006.01)
B60N 2/68 (2006.01)
B60N 2/015 (2006.01)

(52) U.S. Cl.
CPC .............. *B60N 2/3097* (2013.01); *B60N 2/015* (2013.01); *B60N 2/68* (2013.01)

(58) Field of Classification Search
CPC ............ A61F 13/49017; A61F 13/496; A61F 13/49011; A61F 13/49061; A61F 13/4942; A61L 15/24; A61B 17/07207; A61B 17/0644; A61B 2017/0688; A61B 2017/07278
USPC ................. 296/63, 65.17; 297/188.02, 378.12
See application file for complete search history.

(56) References Cited

U.S. PATENT DOCUMENTS

| 3,703,310 | A | * | 11/1972 | Lystad | B60N 2/3011 296/10 |
| 3,822,911 | A | | 7/1974 | Radke et al. | |
| 4,529,159 | A | * | 7/1985 | Terada | B60N 2/1615 248/421 |
| 4,805,952 | A | | 2/1989 | Coleman | |
| 5,106,121 | A | * | 4/1992 | Boone | B60R 22/023 280/807 |
| 5,265,909 | A | | 11/1993 | Verbeski | |
| 5,482,346 | A | * | 1/1996 | Lesourd | B60N 2/3013 296/66 |
| 5,498,051 | A | * | 3/1996 | Sponsler | B60N 2/01583 248/503.1 |
| 5,577,805 | A | * | 11/1996 | Glinter | B60N 2/01583 296/65.03 |
| 5,775,763 | A | * | 7/1998 | Glinter | B60N 2/01583 296/65.03 |
| 6,024,411 | A | * | 2/2000 | Pesta | B60N 2/01583 296/65.01 |
| 6,053,555 | A | * | 4/2000 | Neale | B60N 2/01583 296/65.03 |
| 6,065,804 | A | * | 5/2000 | Tanaka | B60N 2/01583 296/65.03 |
| 6,234,574 | B1 | * | 5/2001 | Hoshihara | B60N 2/01583 297/331 |
| 6,561,583 | B2 | | 5/2003 | Glaser | |
| 6,863,330 | B2 | * | 3/2005 | Yokoyama | B60N 2/01541 248/503.1 |

(Continued)

FOREIGN PATENT DOCUMENTS

WO WO9929534 6/1999

* cited by examiner

Primary Examiner — Kiran B Patel

(57) ABSTRACT

A portable seat assembly includes a frame that may be removably mounted in a vehicle. A plurality of retention units is provided and each of the retention units is attached to the frame. Each of the retention units may engage an inside surface of an exterior wall of the vehicle thereby retaining the frame in an upright position. A lock is attached to one of the retention units. The lock may engage the inside surface of the exterior wall of the vehicle thereby preventing the retention units from being dislodged from the interior surface of the exterior wall of the vehicle. A seat is coupled to the frame and the seat may be sat upon.

18 Claims, 6 Drawing Sheets

U.S. PATENT DOCUMENTS

| | | | | |
|---|---|---|---|---|
| 7,108,305 B2 * | 9/2006 | Frazier | ............... | B60N 2/01583 296/65.03 |
| 7,270,375 B2 * | 9/2007 | Lutzka | ................... | B60N 2/206 297/331 |
| 7,434,862 B2 * | 10/2008 | Lutzka | ............... | B60N 2/01583 248/503.1 |
| 7,500,707 B2 * | 3/2009 | Lutzka | ............... | B60N 2/01583 248/503.1 |
| 7,909,382 B2 * | 3/2011 | Kanamori | ............... | B60N 2/015 296/65.05 |
| D673,786 S | 1/2013 | Szymanski | | |
| 2004/0183328 A1 * | 9/2004 | Daniel | ............... | B60N 2/01541 296/65.03 |
| 2007/0216185 A1 * | 9/2007 | McMillen | ............... | B60N 2/206 296/64 |
| 2008/0030060 A1 * | 2/2008 | Schwingenschlogel | . | B60N 2/06 297/354.12 |
| 2011/0187178 A1 * | 8/2011 | King | ...................... | B62D 25/20 298/17 R |
| 2012/0049595 A1 * | 3/2012 | Inou | ...................... | B60N 2/646 297/284.1 |
| 2012/0126575 A1 * | 5/2012 | Malley | ...................... | B60R 7/02 296/186.1 |
| 2012/0181409 A1 * | 7/2012 | Hayahara | ........... | B60N 2/01575 248/429 |
| 2015/0343991 A1 * | 12/2015 | Brodd | .................... | B60R 22/20 297/452.18 |

PORTABLE SEAT ASSEMBLY

BACKGROUND OF THE DISCLOSURE

Field of the Disclosure

The disclosure relates to seat devices and more particularly pertains to a new seat device for providing additional seating in a vehicle in order to comply with traffic safety laws.

SUMMARY OF THE DISCLOSURE

An embodiment of the disclosure meets the needs presented above by generally comprising a frame that may be removably mounted in a vehicle. A plurality of retention units is provided and each of the retention units is attached to the frame. Each of the retention units may engage an inside surface of an exterior wall of the vehicle thereby retaining the frame in an upright position. A lock is attached to one of the retention units. The lock may engage the inside surface of the exterior wall of the vehicle thereby preventing the retention units from being dislodged from the interior surface of the exterior wall of the vehicle. A seat is coupled to the frame and the seat may be sat upon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
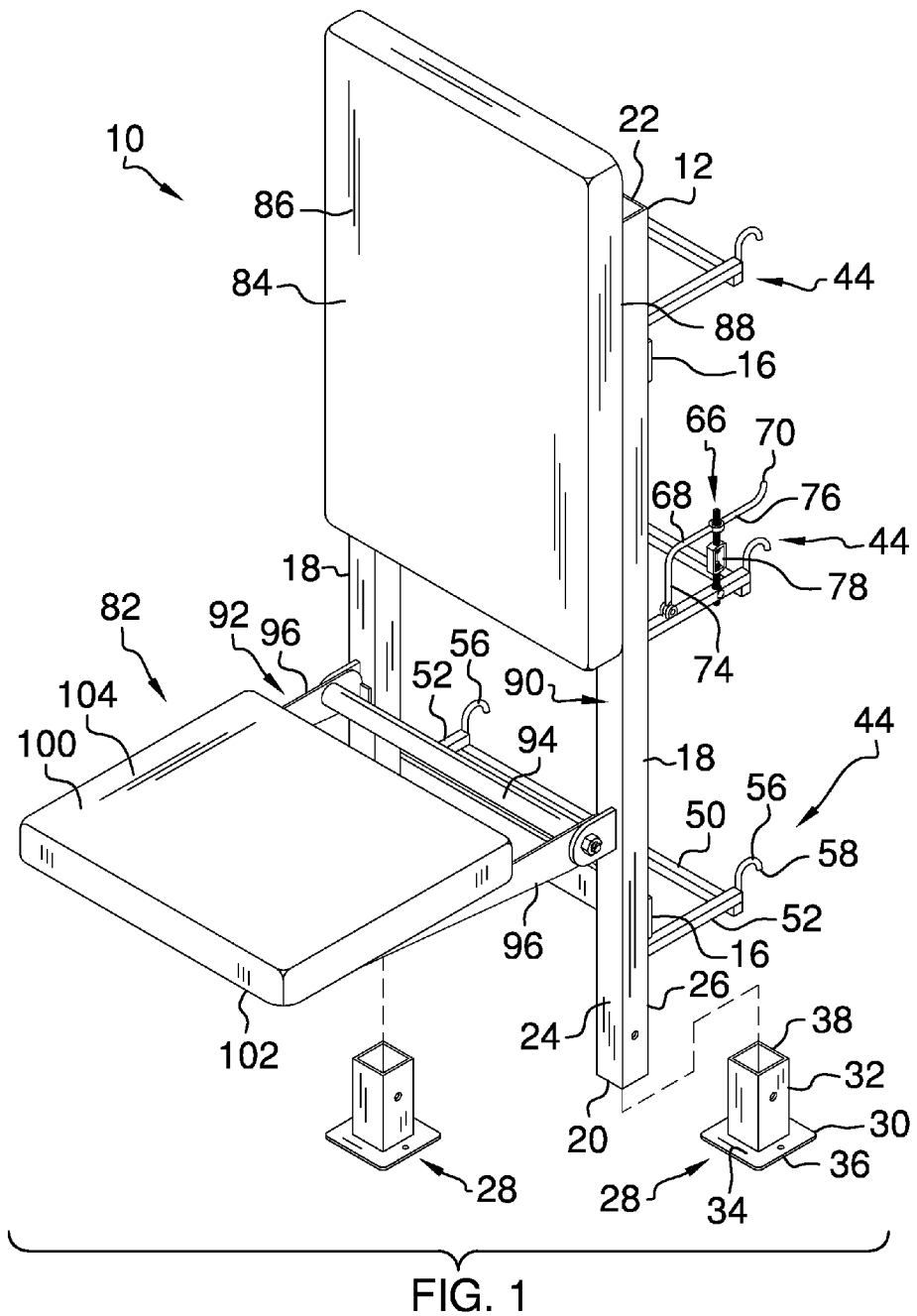
FIG. 1 is a perspective view of a portable seat assembly according to an embodiment of the disclosure.
Figure 2:
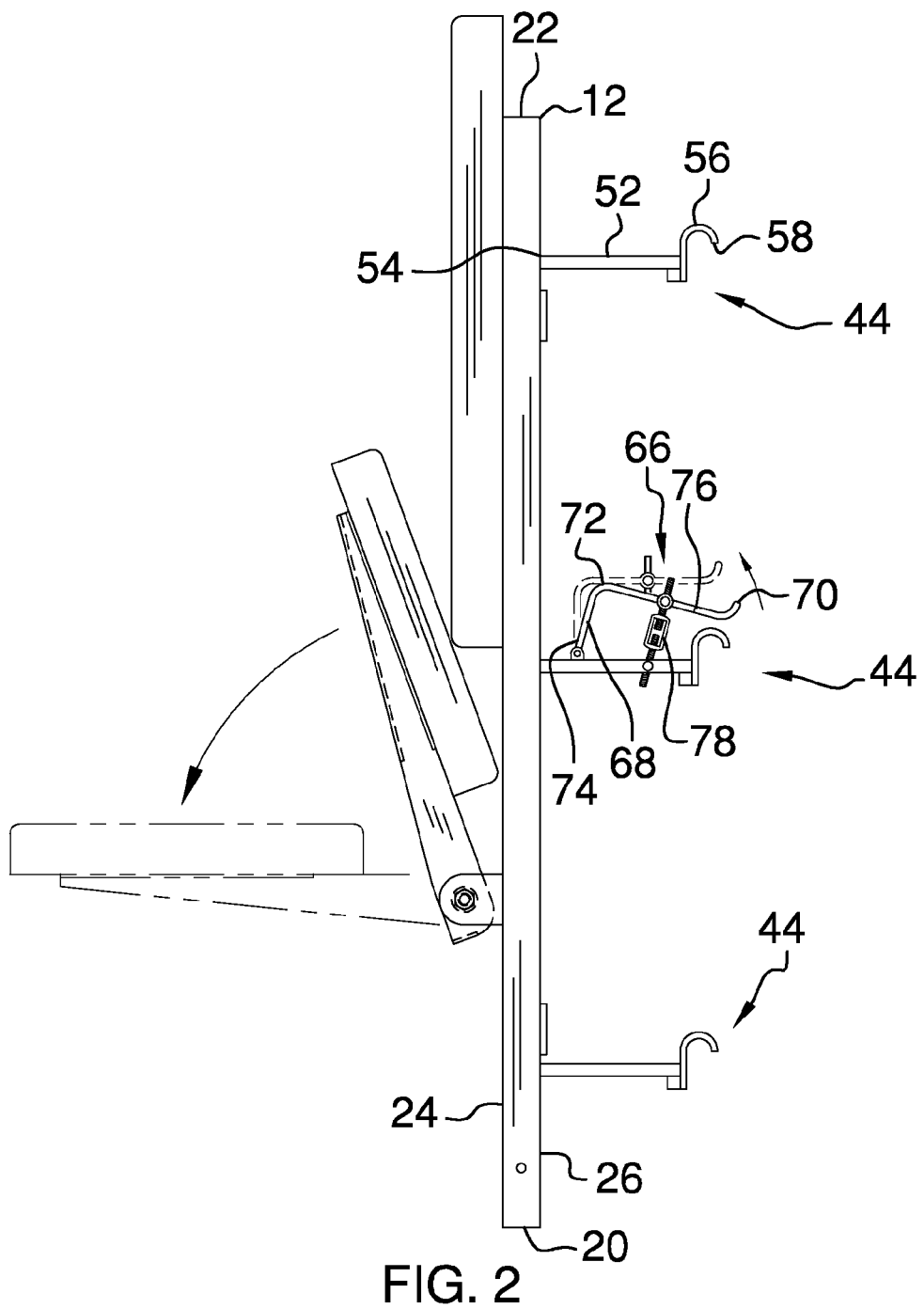
FIG. 2 is a left side view of an embodiment of the disclosure.
Figure 3:
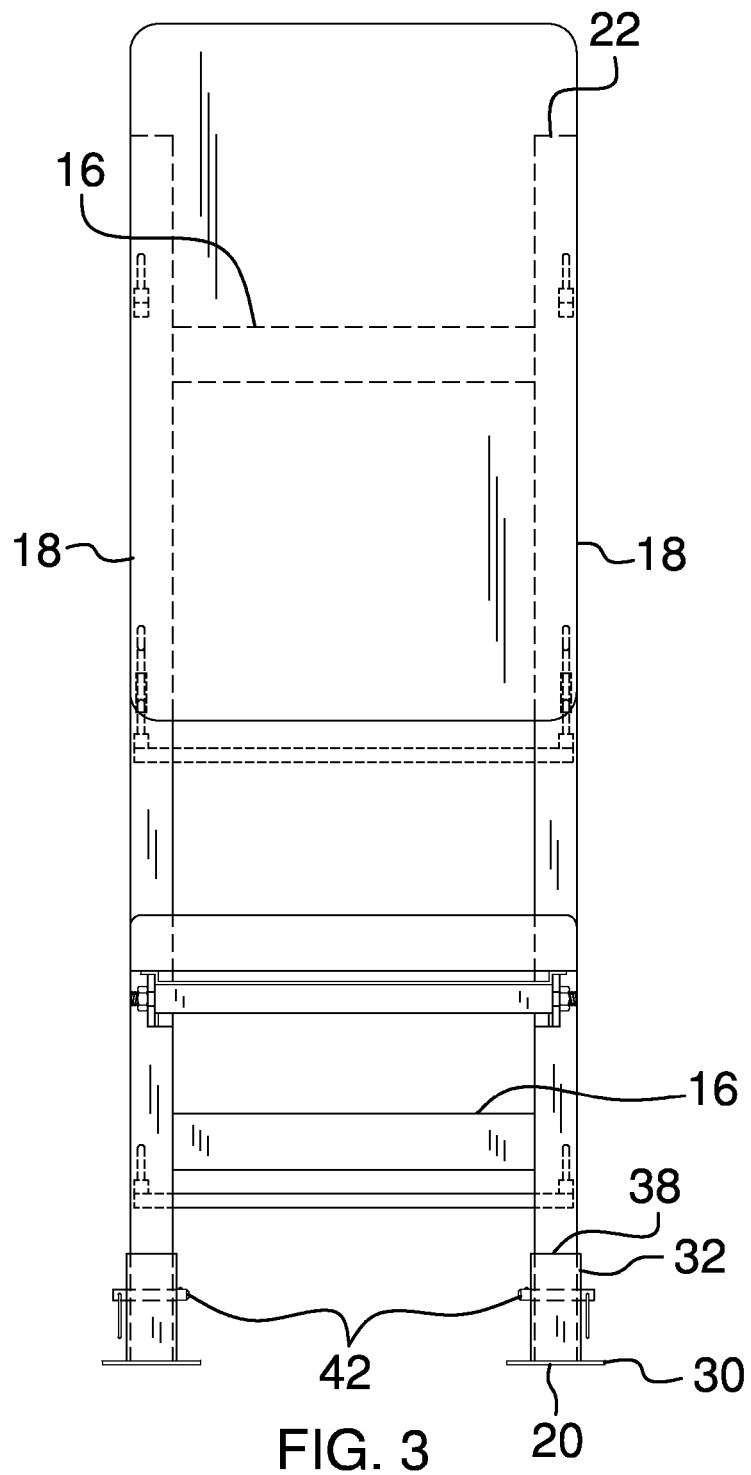
FIG. 3 is a front phantom view of an embodiment of the disclosure.
Figure 4:
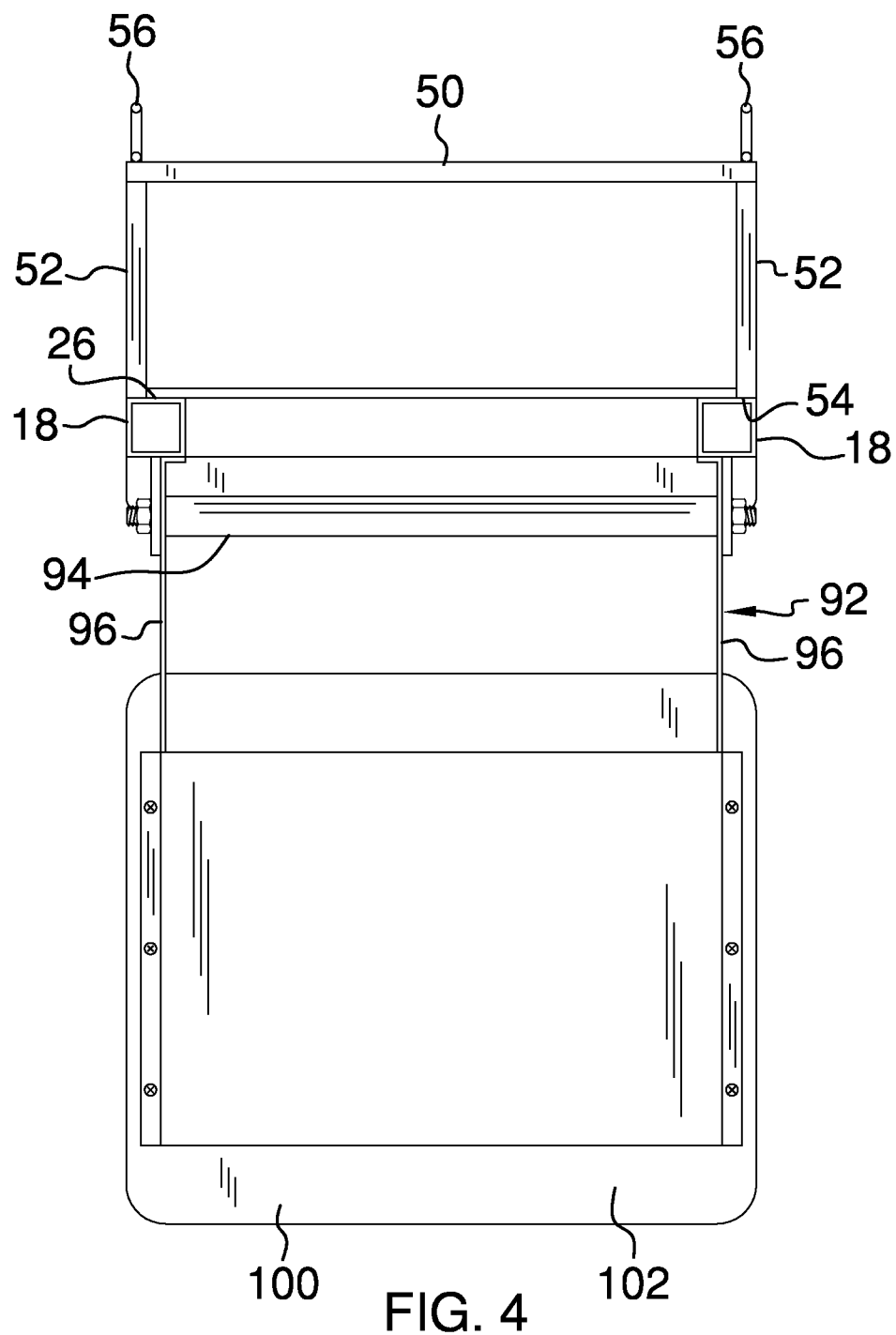
FIG. 4 is a bottom view of an embodiment of the disclosure.
Figure 5:
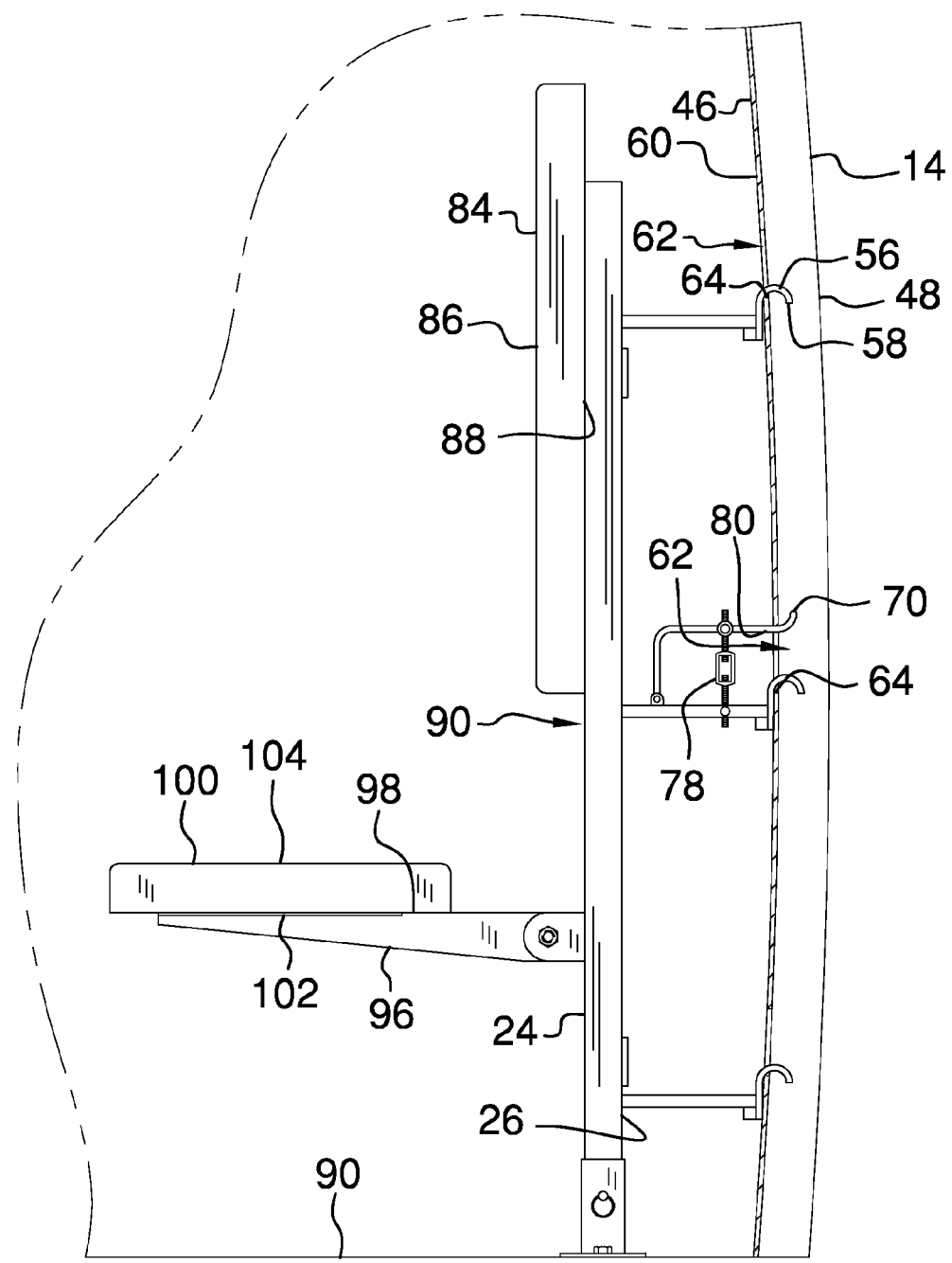
FIG. 5 is a left side perspective view of an embodiment of the disclosure.

With reference now to the drawings, and in particular to FIGS. 1 through 6 thereof, a new seat device embodying the principles and concepts of an embodiment of the disclosure and generally designated by the reference numeral 10 will be described.

As best illustrated in FIGS. 1 through 6, the portable seat assembly 10 generally comprises a frame 12 that may be removably mounted in a vehicle 14. The vehicle 14 may be a cargo van or the like. The frame 12 includes a pair of lateral members 16 that are each coupled to and extending between a pair of longitudinal members 18. Each of the longitudinal members 18 has a first end 20, a second end 22, a front side 24 and a back side 26. One of the lateral members 16 is positioned proximate the first end 20 of each of the longitudinal members 18 and one of the lateral members 16 is positioned proximate the second end 22 of each of the longitudinal members 18.

A pair of mounts 28 is provided and each of the mounts 28 includes a base 30 and a sleeve 32. The base 30 has a top side 34 and a bottom side 36 and the sleeve 32 is coupled to and extends upwardly from the top side 34. The sleeve 32 has a distal end 38 with respect to the top side 34 and the distal end 38 is open. The sleeve 32 is substantially hollow and the bottom side 36 may be attached to a floor 40 of the vehicle 14 having each of the mounts 28 being spaced apart from each other on the floor 40 of the vehicle 14. The distal end 38 of each of the sleeves 32 insertably receives the first end 20 of one of the longitudinal members 18 thereby facilitating the longitudinal members 18 to extend upwardly from the mounts 28. A pair of pins 42 is included and each of the pins 42 is removably extended through the sleeve 32 of an associated one of the mounts 28. The pins 42 extend through an associated one of the longitudinal members 18 thereby retaining the longitudinal members 18 in the mounts 28.

A plurality of retention units 44 is attached to the frame 12 and the retention units 44 are spaced apart from each other and distributed between the first end 20 and the second end 22 of the longitudinal members 18. Each of the retention units 44 may engage an inside surface 46 of an exterior wall 48 of the vehicle 14 thereby retaining the frame 12 in an upright position. Each of the retention units 44 includes a central member 50 that is coupled to and extends between a pair of outward members 52. The outward members 52 are spaced apart from each other and each of the outward members 52 has a distal end 54 with respect to the central member 50. The distal end 54 of each of the outward members 52 is coupled to the back side 26 of an associated one of the longitudinal members 18 and each of the outward members 52 extends away from the back side 26.

A pair of hooks 56 is coupled to an associated one of the outward members 52 and each of the hooks 56 is positioned at an intersection of the outward members 52 and the central member 50. Each of the hooks 56 has a distal end 58 with respect to the outward members 52 and each of the hooks 56 is curved between the outward members 52 and the distal end 58 of the hooks 56. A plurality of cargo rails 60 is attached to the inside surface 46 of the exterior wall 48. Each of the hooks 56 may extend through a slot 62 in selected ones of the cargo rails 60 having the distal end 58 of the hooks 56 extending downwardly in the selected cargo rails 60. Each of the hooks 56 abuts a lower bounding edge 64 of the slot 62.

A lock 66 is attached to one of the retention units 44 to engage the inside surface 46 of the exterior wall 48 of the vehicle 14 thereby preventing the retention units 44 from being dislodged from the interior surface 46 of the exterior wall 48. The lock 66 includes a pair of rods 68 and each of the rods 68 is hingedly attached to one of the outward members 52. Each of the rods 68 has a distal end 70 with respect to the outward members 52 and each of the rods 68 has a bend 72 thereon to define a first portion 74 and a second portion 76 of each of the rods 68. The first portion 74 of each of the rods 68 extends upwardly from the outward members 52 and the second portion 76 is coextensive with the outward members 52. The distal end 70 of each of the rods 68 is directed upwardly from the second portion 76 and the distal end 70 of each of the rods 68 may extend through the slot 62 having the distal end 70 of each of the rods 68 extending upwardly in the selected cargo rails 60.

A pair of turnbuckles 78 is provided and each of the turnbuckles 78 is coupled between an associated one of the outward members 52 and the second portion 76 of an associated one of the rods 68. Each of the turnbuckles 78 has an adjustable height thereby facilitating the second portion 76 of each of the rods 68 to be moved upwardly and downwardly with respect to the outward members 52. Each of the turnbuckles 78 may urge the distal end 70 of an associated one of the rods 68 upwardly in the selected cargo rails 60 to abut an upper bounding edge 80 of the slot 62 thereby preventing the hooks 56 from being removed from the slot 62.

A seat 82 is coupled to the frame 12 and the seat 82 may be sat upon. The seat 82 includes a first pad 84 that has a front side 86 and a back side 88 and the back side 88 of the first pad 84 is attached to the front side 24 of each of the longitudinal members 18. The first pad 84 extends from a center 90 of the longitudinal members 18 beyond the second end 22 of each of the longitudinal members 18.

A seat frame 92 is hingedly coupled to the frame 12 and the seat frame 92 includes a middle arm 94 coupled to and extending between a pair of supports 96. Each of the supports 96 is spaced apart from each other and each of the supports 96 is hingedly coupled to the front side 24 of an associated one of the longitudinal members 18. Each of the supports 96 has a top edge 98 and each of the supports 96 is positionable in a stored position having each of the supports 96 extending upwardly along the longitudinal members 18. Each of the supports 96 is positionable in a deployed position having each of the supports 96 extending forwardly from the longitudinal members 18.

Figure 6:
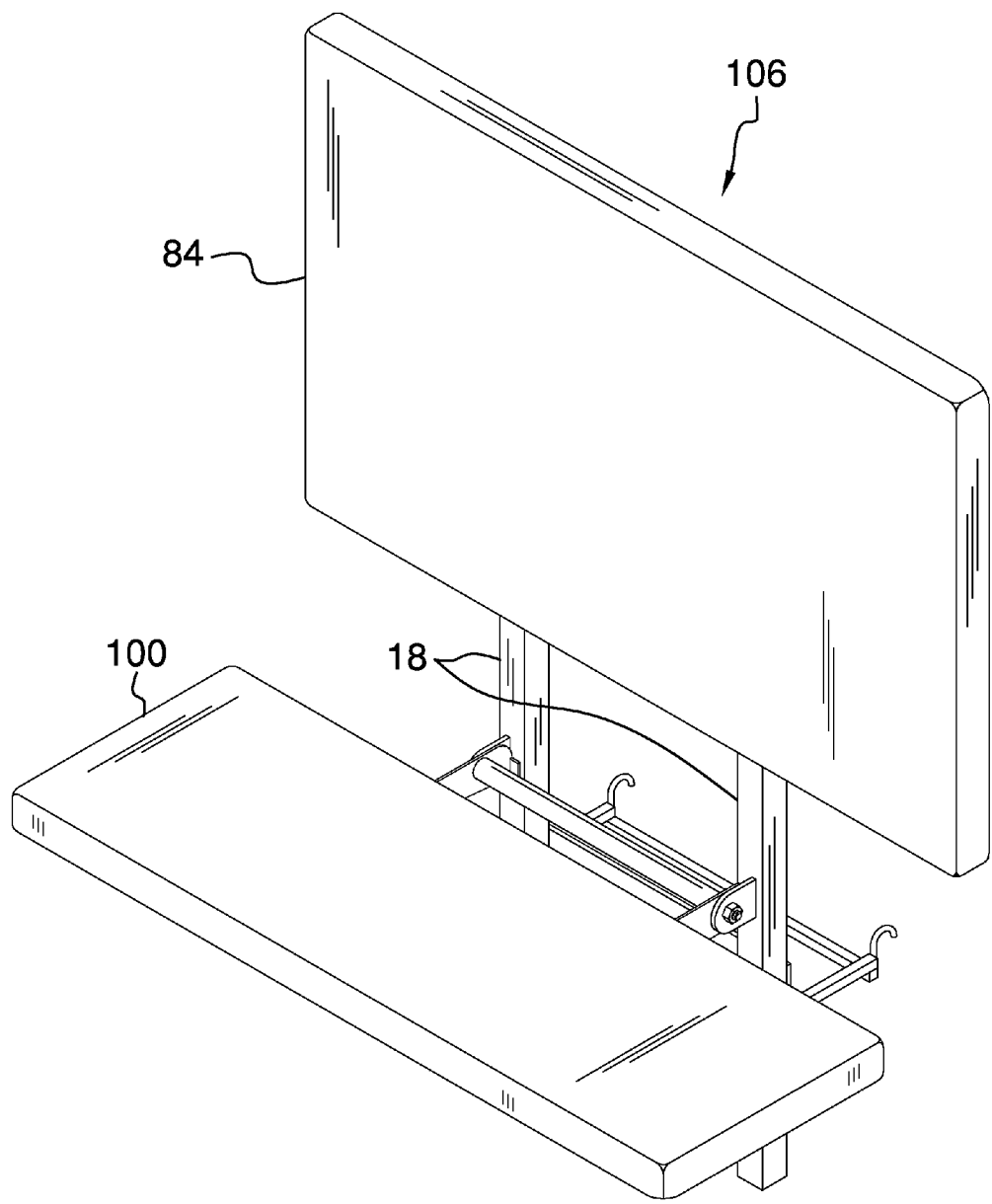
FIG. 6 is a perspective view of an alternative embodiment of the disclosure.

A second pad 100 is provided that has a lower side 102 and an upper side 104. The lower side 102 is attached to the top edge 98 of each of the supports 96 and the second pad 100 may be sat upon when each of the supports 96 is positioned in the deployed position. In an alternative embodiment 106 as shown in FIG. 6, each of the first pad 84 and the second pad 100 may have a width that is great enough to facilitate each of the first 84 and second 100 pads to extend laterally beyond each of the longitudinal members 18. The first pad 84 and the second pad 100 in the alternative embodiment 106 may accommodate more than one occupant.

In use, each of the hooks 56 is positioned within the slot 62 in the selected cargo rails 60 and the first end 20 of each of the longitudinal members 18 is inserted into the distal end 38 of an associated one of the sleeves 32 such that each of the hooks 56 abuts the lower bounding edge 64 of the slots 62. The pins 42 are extended through the sleeves 32 to retain the frame 12 in the mounts 28. The distal end 70 of each of the rods 68 is inserted into the slots 62 and the turnbuckles 78 are adjusted such that the each of the rods 68 abuts the upper bounding edge 80 of the slots 62. The supports 96 are positioned in the deployed position and the second pad 100 is sat upon. The supports 96 are positioned in the stored position when the second pad 100 is not in use. The seat 82 provides additional seating for occupants of the vehicle 14 if the number of occupants in the vehicle 14 exceeds a seating capacity of the vehicle 14 thereby facilitating the vehicle 14 to be operated within the requirements of traffic safety laws.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable seat assembly configured to be mounted in a cargo vehicle, said assembly comprising:
   a frame configured to be removably mounted in a vehicle;
   a plurality of retention units, each of said retention units being attached to said frame, each of said retention units being configured to engage an inside surface of an exterior wall of the vehicle thereby retaining said frame in an upright position;
   a lock being attached to one of said retention units, said lock being configured to engage the inside surface of the exterior wall of the vehicle thereby preventing said retention units from being dislodged from the interior surface of the exterior wall of the vehicle; and
   a seat coupled to said frame, said seat being configured to be sat upon.

2. The assembly according to claim 1, wherein said frame comprises a pair of lateral members being coupled to and extending between a pair of longitudinal members, each of said longitudinal members having a first end, a second end, a front side and a back side, one of said lateral members being positioned proximate said first end of each of said longitudinal members and one of said lateral members being positioned proximate said second end of each of said longitudinal members.

3. The assembly according to claim 1, further comprising a pair of mounts, each of said mounts having a base and a sleeve, said base having a top side and a bottom side, said sleeve being coupled to and extending upwardly from said top side, said sleeve having a distal end with respect to said top side, said distal end being open, said sleeve being substantially hollow.

4. The assembly according to claim 3, wherein:
   said frame has a pair of longitudinal members, each of said longitudinal members having a first end; and
   said bottom side is configured to be attached to a floor of the vehicle, each of said mounts being spaced apart from each other on the floor of the vehicle, said distal end of each of said mounts insertably receiving said first end of one of said longitudinal members such that said longitudinal members extends upwardly from said mounts.

5. The assembly according to claim 4, further comprising a pair of pins, each of said pins being removably extended through said sleeve of an associated one of said mounts and extending through an associated one of said longitudinal members thereby retaining said longitudinal members in said mounts.

6. The assembly according to claim 1, wherein:
said frame includes a pair of longitudinal members, each of said longitudinal members having a first end and a second end; and
said retention units are spaced apart from each other and distributed between said first end and said second end of said longitudinal members.

7. The assembly according to claim 6, wherein:
each of said longitudinal members has a back side; and
each of said retention units comprises a central member coupled to and extending between a pair of outward members, said outward members being spaced apart from each other, each of said outward members having a distal end with respect to said central member, said distal end of each of said outward members being coupled to said back side of an associated one of said longitudinal members of said frame, each of said outward members extending away from said back side.

8. The assembly according to claim 7, further comprising a pair of hooks, each of said hooks being coupled to an associated one of said outward members, each of said hooks being positioned at an intersection of said outward members and said central member, each of said hooks having a distal end with respect to said outward members, each of said hooks being curved between said outward members and said distal end of said hooks.

9. The assembly according to claim 8, wherein each of said hooks is configured to extend through a slot in a cargo rail of the vehicle having said distal end extending downwardly in the cargo rail, each of said hooks being configured to abut a lower bounding edge of the slot.

10. The assembly according to claim 1, wherein:
each of said retention members includes a pair of outward members; and
said lock comprises a pair of rods, each of said rods being hingedly attached to one of said outward members, each of said rods having a distal end with respect to said outward members, each of said rods having a bend thereon to define a first portion and a second portion of each of said rods, said first portion of each of said rods extending upwardly from said outward members, said second portion being coextensive with said outward members.

11. The assembly according to claim 10, further comprising:
a cargo rail having a slot; and
said distal end of each of said rods is directed upwardly from said second portion, said distal end of each of said rods being configured to extend through the slot having said distal end of each of said rods extending upwardly in the cargo rail.

12. The assembly according to claim 11, further comprising a pair of turnbuckles, each of said turnbuckles being coupled between an associated one of said outward members and said second portion of an associated one of said rods, each of said turnbuckles having an adjustable height thereby facilitating said second portion of each of said rods to be moved upwardly and downwardly with respect to said outward members.

13. The assembly according to claim 12, further comprising:
a pair of hooks; and
each of said turnbuckles being configured to urge said distal end of an associated one of said rods upwardly in the cargo rail to abut an upper bounding edge of the slot thereby preventing said hooks from being removed from the slot.

14. The assembly according to claim 1, wherein:
said frame includes a pair of longitudinal members, each of said longitudinal members has a front side and a second end; and
said seat comprises a first pad having a front side and a back side, said back side of said first pad being attached to said front side of each of said longitudinal members, said first pad extending from a center of said longitudinal members beyond said second end of each of said longitudinal members.

15. The assembly according to claim 14, further comprising a seat frame hingedly coupled to said frame, said seat frame comprising a middle arm coupled to and extending between a pair of supports, each of said supports being spaced apart from each other, each of said supports being hingedly coupled to said front side of an associated one of said longitudinal members.

16. The assembly according to claim 15, wherein each of said supports has a top edge, each of said supports being positionable in a stored position having each of said supports extending upwardly along said longitudinal members, each of said supports being positionable in a deployed position having each of said supports extending forwardly from said longitudinal members.

17. The assembly according to claim 16, wherein a second pad has a lower side and an upper side, said lower side being attached to said top edge of each of said supports, said second pad being configured to be sat upon when each of said supports is positioned in said deployed position.

18. A portable seat assembly configured to be mounted in a cargo vehicle, said assembly comprising:
a frame configured to be removably mounted in a vehicle, said frame comprising
a pair of lateral members being coupled to and extending between a pair of longitudinal members, each of said longitudinal members having a first end, a second end, a front side and a back side, one of said lateral members being positioned proximate said first end of each of said longitudinal members and one of said lateral members being positioned proximate said second end of each of said longitudinal members,
a pair of mounts, each of said mounts having a base and a sleeve, said base having a top side and a bottom side, said sleeve being coupled to and extending upwardly from said top side, said sleeve having a distal end with respect to said top side, said distal end being open, said sleeve being substantially hollow, said bottom side being configured to be attached to a floor of the vehicle, each of said mounts being spaced apart from each other on the floor of the vehicle, said distal end of each of said mounts insertably receiving said first end of one of said longitudinal members such that said longitudinal members extends upwardly from said mounts, and
a pair of pins, each of said pins being removably extended through said sleeve of an associated one of said mounts and extending through an associated one of said longitudinal members thereby retaining said longitudinal members in said mounts,
a plurality of retention units, each of said retention units being attached to said frame, said retention units being spaced apart from each other and distributed between said first end and said second end of said longitudinal members, each of said retention units being configured to engage an inside surface of an exterior wall of the vehicle thereby retaining said frame in an upright position, each of said retention units comprising a central member coupled to and extending between a pair of outward members, said outward members being spaced apart from each other, each of said outward members having a distal end with respect to said central member, said distal end of each of said outward members being coupled to said back side of an associated one of said longitudinal members of said frame, each of said outward members extending away from said back side, and a pair of hooks, each of said hooks being coupled to an associated one of said outward members, each of said hooks being positioned at an intersection of said outward members and said central member, each of said hooks having a distal end with respect to said outward members, each of said hooks being curved between said outward members and said distal end of said hooks, each of said hooks being configured to extend through a slot in a cargo rail of the vehicle having said distal end extending downwardly in the cargo rail, each of said hooks being configured to abut a lower bounding edge of the slot, a lock being attached to one of said retention units, said lock being configured to engage the inside surface of the exterior wall of the vehicle thereby preventing said retention units from being dislodged from the interior surface of the exterior wall of the vehicle, said lock comprising a pair of rods, each of said rods being hingedly attached to one of said outward members, each of said rods having a distal end with respect to said outward members, each of said rods having a bend thereon to define a first portion and a second portion of each of said rods, said first portion of each of said rods extending upwardly from said outward members, said second portion being coextensive with said outward members, said distal end of each of said rods being directed upwardly from said second portion, said distal end of each of said rods being configured to extend through the slot having said distal end of each of said rods extending upwardly in the cargo rail, and a pair of turnbuckles, each of said turnbuckles being coupled between an associated one of said outward members and said second portion of an associated one of said rods, each of said turnbuckles having an adjustable height thereby facilitating said second portion of each of said rods to be moved upwardly and downwardly with respect to said outward members, each of said turnbuckles being configured to urge said distal end of an associated one of said rods upwardly in the cargo rail to abut an upper bounding edge of the slot thereby preventing said hooks from being removed from the slot, and a seat coupled to said frame, said seat being configured to be sat upon, said seat comprising a first pad having a front side and a back side, said back side of said first pad being attached to said front side of each of said longitudinal members, said first pad extending from a center of said longitudinal members beyond said second end of each of said longitudinal members, a seat frame hingedly coupled to said frame, said seat frame comprising a middle arm coupled to and extending between a pair of supports, each of said supports being spaced apart from each other, each of said supports being hingedly coupled to said front side of an associated one of said longitudinal members, each of said supports having a top edge, each of said supports being positionable in a stored position having each of said supports extending upwardly along said longitudinal members, each of said supports being positionable in a deployed position having each of said supports extending forwardly from said longitudinal members, and a second pad having a lower side and an upper side, said lower side being attached to said top edge of each of said supports, said second pad being configured to be sat upon when each of said supports is positioned in said deployed position.

\* \* \* \* \*